(12) United States Patent
Motominami et al.

(10) Patent No.: US 6,765,696 B1
(45) Date of Patent: Jul. 20, 2004

(54) IMAGE READING APPARATUS

(75) Inventors: Yoshihisa Motominami, Suwa (JP); Noriyuki Nouda, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 532 days.

(21) Appl. No.: 09/716,966

(22) Filed: Nov. 22, 2000

(30) Foreign Application Priority Data

Nov. 25, 1999 (JP) .......................................... 11-334557

(51) Int. Cl.[7] .............................................. H04N 1/40
(52) U.S. Cl. ........................ 358/471; 358/475; 358/509; 358/487
(58) Field of Search ................................ 358/471, 474, 358/505, 509, 513, 482, 448, 475, 510, 446, 487

(56) References Cited

U.S. PATENT DOCUMENTS 5,814,809 A * 9/1998 Han ........................ 250/208.1

FOREIGN PATENT DOCUMENTS

| EP | 0 804 013 A2 | 10/1997 | .......... H04N/1/100 |
|---|---|---|---|
| EP | 0804013 A2 * | 10/1997 | .......... H04N/1/100 |
| EP | 0933918 A2 * | 4/1999 | .......... H04N/1/100 |
| EP | 0 933 918 A2 | 8/1999 | .......... H04N/1/100 |

* cited by examiner

*Primary Examiner*—Kimberly Williams
*Assistant Examiner*—Negussie Worku
(74) *Attorney, Agent, or Firm*—Oliff & Berridge, PLC

(57) ABSTRACT

When an image reading apparatus (1) shifts from a standby condition to a power economizing state, a buffer (15) electrically disconnects a connection path 14. Subsequently, a switch 13 electrically disconnects a power supply path 12. When the image reading apparatus 1 shifts from a power economizing state to a standby condition, the switch 13 electrically connects the power supply path 12, thereby commencing the supply of power to an image pickup section 20. Subsequently, the buffer 15 electrically connects the connection path 14. Consequently, even in a case where the supply of power to the image pickup section 20 is stopped, an electric current will not flow from the image processing section 6 to an analog-to-digital converter 22. Thus, breakage of elements included in the analog-to-digital converter 22 can be prevented. Further, when the image reading apparatus 1 is in a power economizing state, the supply of power to the image pickup section 20 and the fan 10 as well as to a light source 51 is stopped. Therefore, the image reading apparatus 1 can reduce power consumption by a greater amount than does a related image reading apparatus which extinguishes only a light source.

7 Claims, 5 Drawing Sheets

IMAGE READING APPARATUS

BACKGROUND OF THE INVENTION

1. Field of the Invention

The present invention relates to an image reading apparatus. The present application is based on Japanese Patent Application No. Hei. 11-334557, which is incorporated herein by reference.

2. Description of the Related Art

A flatbed image reading apparatus has hitherto been known as an example of an image reading apparatus for reading an original, such as a graphic image or characters. An image reading table comprised of a transparent plate, such as glass, is provided on the upper surface of a box-shaped housing of the flatbed image reading apparatus. A carriage is disposed within the housing and is moved parallel to the image reading table by a driving device. The carriage is equipped with a light source and a line sensor comprised of a row of photoelectric transducers. Light originating from the light source of the carriage is reflected by the surface of an original located on the image reading table, and a condenser lens converges the light on the line sensor.

The thus-converged light is converted into an electric signal by the line sensor. The electric signal is further converted into a digital signal by a converter. After having been subjected to correction, such as shading correction, in an image processing section of the image reading apparatus, the digital signal is output to an external personal computer as image data.

When a user plugs a power cord to an outlet and turns on a light source switch, the light source is illuminated. The image reading apparatus performs a warm-up operation until the amount of light originating from the light source becomes sufficient for reading an original. After having completed the warm-up operation, the image reading apparatus enters a standby state in which it can read an original. The time required for performing a warm-up operation may vary according to the type of a light source. For example, a xenon lamp employed for a higher-end model requires a warm-up time of 0.1 sec. or less, and a mercury lamp employed for a prevailing model requires a warm-up time of one min. or thereabouts.

The U.S. Environmental Protection Agency (EPA) has issued recommendations concerning energy conservation; that is, the so-called Energy Star program for reducing power consumed while a device remains inoperative. Computer peripheral devices which are not limited to image reading apparatuses and are to comply with the Energy Star program must be controlled such that the devices enter a power economizing state in which power consumed within the devices falls below a predetermined value.

When the image reading apparatus is controlled to so as to remain in an energy economizing state, internal power consumed by the image reading apparatus is preferably minimized. To this end, a reduction in power consumption must be implemented not only in the light source but also in every circuit of the image reading apparatus, such as an optical sensor or an image processing section having a storage section provided therein.

In the event of an interruption in power supplied to the storage section of the image processing section storing data which needs not be updated within a short period of time, such as a gamma function to be used for preparing image data, data stored in the storage section, such as a gamma function, are also deleted. If the data stored in the storage section are deleted, the image reading apparatus returns to a standby state. When power supply is resumed, there arises a necessity for reacquiring the data. Every time the image reading apparatus shifts to a standby state from the power economizing state and the optical sensor and the transducer are initialized, the characteristic values unique to the optical sensor and the transducers must be recaptured. As a result, a warm-up operation during which the image reading apparatus shifts from the power economizing state to the standby state requires much time or involves re-set-up of the image reading apparatus, thereby resulting in a decrease in operability of the image reading apparatus.

Even when power supplied to an image pick-up section and an image processing section is stopped, an electric current flows through some circuits, such as a circuit for oscillating a clock signal. A signal current which is to originally flow from a transducer provided in the image pick-up section to the processing section may flow from the processing section to the transducer, thereby breaking elements included in the transducer.

SUMMARY OF THE INVENTION

It is an object of the present invention to provide an image reading apparatus which can reduce power consumption and prevent breakage of elements. Further, it is another object of the present invention to provide an image reading apparatus capable of improving operability.

To achieve the above objects, according to the present invention, there is provided an image reading apparatus which comprises an image reading table on which an original is placed, a light source which illuminates the original, an image pickup section including an optical sensor which converts, into an electric signal, at least one of a light reflected from the original and a light having been transmitted through the original, and a converter which converts the electric signal into a digital signal, an image processing section which produces image data on the basis of the digital signal and can output the image data, a control section capable of controlling the light source, the image pickup section, and the image processing section so as to enter one of an operating state in which the original is read, a standby condition in which the image reading apparatus is in a standby condition while remaining able to read the original, and a power economizing state in which power to be consumed is reduced, a first switching device which connects or disconnects supply of power to the image pickup section, and a second switching device which establishes or cancels an electrical connection between the converter and the image processing section. Further, according to the present invention, it is preferable that when the standby condition is shifted to the power economizing state, the control section causes the first switching device to electrically open after having electrically opened the second switching device. Furthermore, according to the present invention, it is preferable that when the power economizing state is shifted to the standby condition, the control section causes the second switching device to electrically close after having electrically closed the first switching device.

The second switching device cancels an electrical connection between the transducer and the image processing section, thereby preventing flow of a signal from the image processing section to the transducer. Flow of an electric current from the image processing section to the transducer can be interrupted by switching the first and second switching devices at different timings. The image reading apparatus can reduce power consumption by a greater amount than does a related image reading apparatus which reduces power consumption by extinguishing the light source, thereby preventing breakage of elements.

In the image reading apparatus according to the present invention, it is preferable that the image processing section is electrically energized in the power economizing state. Thus, it is preferable that an electric current flows through the image processing section even when the image reading apparatus is in the power economizing state. Data which are preferably preserved for a long period of time, such as a gamma function, can be stored by permitting flow, to the image processing section, of a minimum electric current required for presenting data, thereby obviating a necessity for recapturing data when the image reading apparatus shifts from the power economizing state to the standby state. Therefore, the image reading apparatus can be warmed up within a short period of time, thereby obviating re-setup of the image reading apparatus and improving operability of the same.

In the image reading apparatus according to the present invention, it is preferable to be further comprised of a ventilating section capable of blowing air to the light source section, the image pick-up section, the image processing section, and a control section of the image reading apparatus, wherein the ventilating section operates in association with operation of the image pickup section. Accordingly, a circuit which produces a large amount of heat, such as a light source, can be cooled. The ventilating section operates in association with operation of the image pick-up section. When the light source is extinguished in a power economizing state and when the supply of power to the image pick-up section is stopped, the ventilating section is inoperative. Consequently, even in a case where the image reading apparatus is equipped with the ventilating section, power consumption of the image reading apparatus can be reduced.

In the image reading apparatus according to the present invention, it is preferable that the control section captures information on the image pickup section in the standby condition, and the control section initializes the image pickup section on the basis of the information when the power economizing state is shifted to the standby condition. For example, when the image reading apparatus remains in a standby state, the control section captures information about the image pick-up section, such as a photoelectric-transducing characteristic of an optical sensor or an offset or gain of the transducer. When the image reading apparatus shifts from a power economizing state to a standby state, the image pick-up section is initialized on the basis of the thus-captured information, thus obviating a necessity for resetting of the information about the image pick-up section when the image reading apparatus shifts to a standby state. The image pick-up section can be initialized within a short period of time, thus improving the operability of the image reading apparatus.

In the image reading apparatus according to the present invention, it is preferable to be further comprised of an instruction input section which enables entry, with respect to the control section from an outside, of an instruction for instructing to shift from the power economizing state to the standby condition. Accordingly, the image reading apparatus can be shifted from the power economizing state to the standby state, by the user merely entering an instruction to the instruction input section, thereby facilitating handling of the image reading apparatus and improving the operability of the same.

DETAILED DESCRIPTION OF THE PREFERRED EMBODIMENTS

1. First Embodiment

Figure 1:
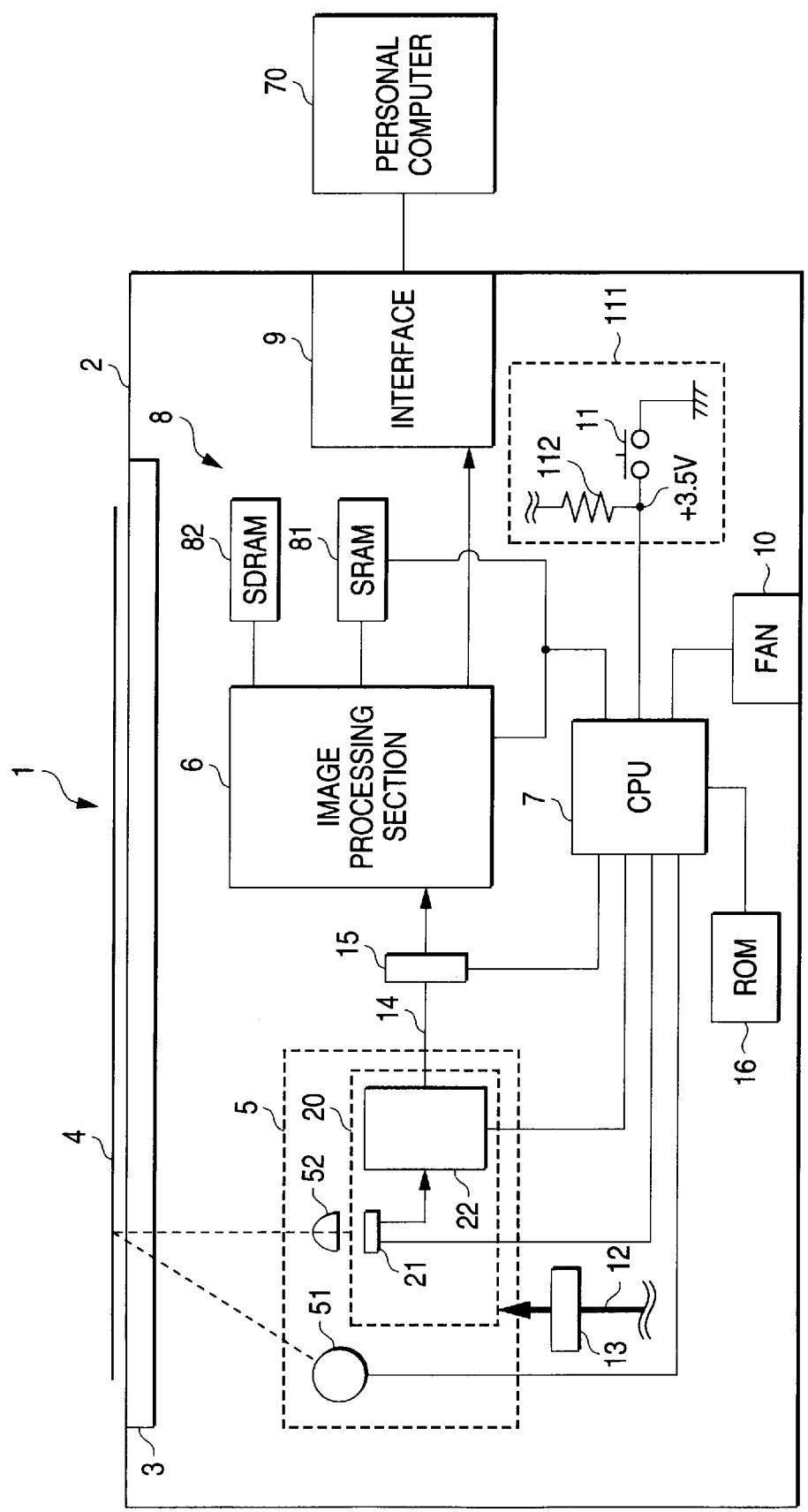
FIG. 1 is a block diagram showing an image reading apparatus according to a first embodiment of the present invention.

FIG. 1 is a block diagram showing an image reading apparatus according to a first embodiment of the present invention.

Image reading apparatuses to which the present invention can be applied include a flatbed image reading apparatus which reads an original placed on an image reading table by moving a carriage back and forth in parallel with the image reading table, and a sheet-feeding type image reading apparatus which feeds an original past a stationary light source or optical sensor. The present embodiment will be described with reference to a flatbed image reading apparatus.

An image reading apparatus 1 shown in FIG. 1 is equipped with an image reading table 3 on which an original 4 is to be placed and which is provided in an upper surface of a box-shaped housing 2. In the housing 2, there is a carriage 5 which is moved back and forth in parallel with the image reading table 3 by a drive unit (not shown). In the housing 2, there are further provided an image processing section 6, a CPU 7 serving as a control section, and an interface 9.

In the carriage 5, there are provided a light source 51 for illuminating the original 4; a condenser lens 52 for converging the light which originates from the light source 51 and is reflected from the surface of the original 4; and an image pick-up section 20 converting the light reflected from the original into an electric signal and converting the electric signal into a digital signal.

In the first embodiment, a xenon lamp is utilized as the light source 51. The xenon lamp shifts, within a short period of time, from a power economizing state to a state at which it can illuminate a readable amount of light.

The digital signal output from the image pick-up section 20 is corrected by the image processing section 6, whereby image data are produced. The thus-produced image data are output to an external processing apparatus, such as a personal computer 70, by way of an interface 9.

The image reading apparatus 1 is further equipped with a fan 10 which serves as a ventilating section for blowing air to cool the inside of the housing 2 of the image reading apparatus 1, and an operation switch 11 serving as an instruction input section which enables entry of an instruction to the CPU 7 from the outside of the image reading apparatus 1.

The image pickup section 20 comprises an optical sensor 21 for converting the light reflected from the original 4 to an electric signal, and an analog-to-digital converter 22 for converting the electric signal into a digital signal. An optical sensor of charge storage type, such as a charge-coupled device (CCD), is used as the optical sensor 21. Power is supplied from a power supply section (not shown) to the image pickup section 20 via the power supply path 12. A switch 13 is connected to the power supply path 12 so as to serve as a first switching device which is able to interrupt the supply of power to the image pickup section 20. For example, the switch 13 may be considered to be a semiconductor switch, a relay, or the like, however it should not limit the switch 13 to these examples. In accordance with an instruction output from the CPU 7, the switch 13 is electrically closed or opened so as to connect or disconnect the power supply path 12. When the switch 13 is electrically closed, the image pickup section 20 is electrically energized via the power supply path 12. However, when the power supply path 12 is electrically disconnected, the image pickup section 20 is not electrically energized.

A connection path 14 is able to establish an electrical connection between the analog-to-digital converter 22 and the image processing section 6, and has a buffer 15 serving as a second switching device. The buffer 15 prevents breakage of elements included in the analog-to-digital converter 22, which would otherwise be caused by flow of a clock signal current oscillated by the image processing section 6 when the image pickup section 20 is not electrically energized. For example, the buffer 15 may be considered to be a semiconductor switch, a relay, or the like, however it should not limit the buffer 15 to these examples. Further, the buffer 15 may be provided within the image processing section 6.

The light source 51, the image pickup section 20, the image processing section 6, the interface 9, the fan 10, the operation switch 11, the switch 13, and the buffer 15 are connected to the CPU 7. The CPU 7 can control all of these.

The image processing section 6 includes a storage section 8, a shading correction section, a gamma correction section, and other correction sections. The shading correction section corrects variations in the sensitivity of respective elements of the line sensor and variations in the quantity of light emitted from the light source in the major scanning direction, through use of white reference data and black reference data read before reading of the original 4. The gamma correction section performs a gamma correction operation through use of a predetermined gamma function, thereby converting the signal output from the shading correction section into image data. Other correction sections perform color correction operation, a gamma correction operation, and other correction operations, thereby converting the digital signal input by way of the image pickup section 20 into image data.

The storage section 8 is made up of SRAM (Static Random Access Memory) 81 and SDRAM (Synchronous Dynamic RAM) 82. The storage section 8 is connected to the image processing section 6.

The SRAM 81 is smaller in storage capacity per element than the SDRAM 82, is of power economizing type, and does not require a refreshing operation. For these reasons, data which are not susceptible to changes and are preferably preserved for a long period of time; for example, a gamma function, are stored in the SRAM 81.

In contrast, the SDRAM 82 needs to be refreshed, and an interruption in the supply of power induces deletion of stored data. On the other hand, the SDRAM 82 can quickly transmit information in synchronism with a clock signal output from the image processing section 6. Further, the SDRAM 82 is greater in storage capacity per element than the SRAM 81. For these reasons, data which are susceptible to changes and are preferably updated within a short period of time; for example, white reference data and black reference data, are stored in the SDRAM 82. Here, the expression "data to be preferably updated within a short period of time" designates data which must be updated every time the image reading apparatus 1 is started up or every time the image reading apparatus 1 shifts from the power economizing state to be described later to a standby condition.

The fan 10 is provided for cooling the inside of the housing 2 and is controlled by the CPU 7. The fan 10 is operated in association with establishment and cancellation of an electrical connection with the image pickup section 20. During a power economizing state in which a small amount of heat is produced, the fan 10 remains inoperative, thereby reducing power consumed during the power economizing state.

The CPU 7 is connected to read only memory (ROM) 16. Instructions required for the CPU 7 to control individual sections of the image reading apparatus 1 are stored as a computer program in the ROM 16.

An electric circuit 111 including the operation switch 11 has a pull-up resistor 112, so that a +3.5V pull-up circuit is formed. When a user presses the operation switch 11, the CPU 7 perceives actuation of the operation switch 11. The CPU 7 can perceive different instructions according to the state of the image reading apparatus 1. For example, when the user presses the operation switch 11 while the image reading apparatus 1 is in a standby condition, the CPU 7 determines pressing action of the operation switch 11 as an instruction for commencing reading of the original 4. When the user presses the operation switch 11 while the image reading apparatus 1 is in a power economizing state, the CPU 7 determines the pressing action as an instruction for restoring the image reading apparatus 1 to a standby condition.

The user can issue an instruction to the image reading apparatus 1 by way of the personal computer 70, as well as by way of the operation switch 11.

The CPU 7 can control the foregoing individual component circuits; that is, the image reading apparatus 1, so as to enter any one of three states: (1) an operating state, (2) a standby condition, and (3) a power economizing state. In the present embodiment, a xenon lamp is used as the light source 51, and hence a time of one sec. or less is required from the time when the light source 51 is in an extinguished state until the light source 51 illuminates a sufficient amount of light. Thus, the xenon lamp does not need a warm-up operation. Hence, when the image reading apparatus 1 becomes operative, the light source 51 is illuminated. In contrast, when the image reading apparatus 1 becomes inoperative, the light source 51 is extinguished.

Respective states of the image reading apparatus 1 now will be described.

(1) Operating state: The light source 51 is illuminated, and the carriage 5 is moved in parallel with the image reading table 3, thereby reading the original 4 placed on the image reading table 3.

(2) Standby condition: The light source 51 remains extinguished. When the user enters an instruction by way of the operation switch 11 or a personal computer, the light source 51 is illuminated, and the image reading apparatus 1 enters an operating state, in which reading of the original 4 is possible. If ten minutes have lapsed without entry of an instruction from the user while the image reading apparatus 1 remains in a standby condition, the image reading apparatus 1 shifts from the standby condition to a power economizing state.

(3) Power economizing state: The light source 51 remains extinguished. The power consumed by the image reading apparatus 1 is reduced to 12W or less so as to comply with the guidelines of the Energy Star program.

Figure 2:
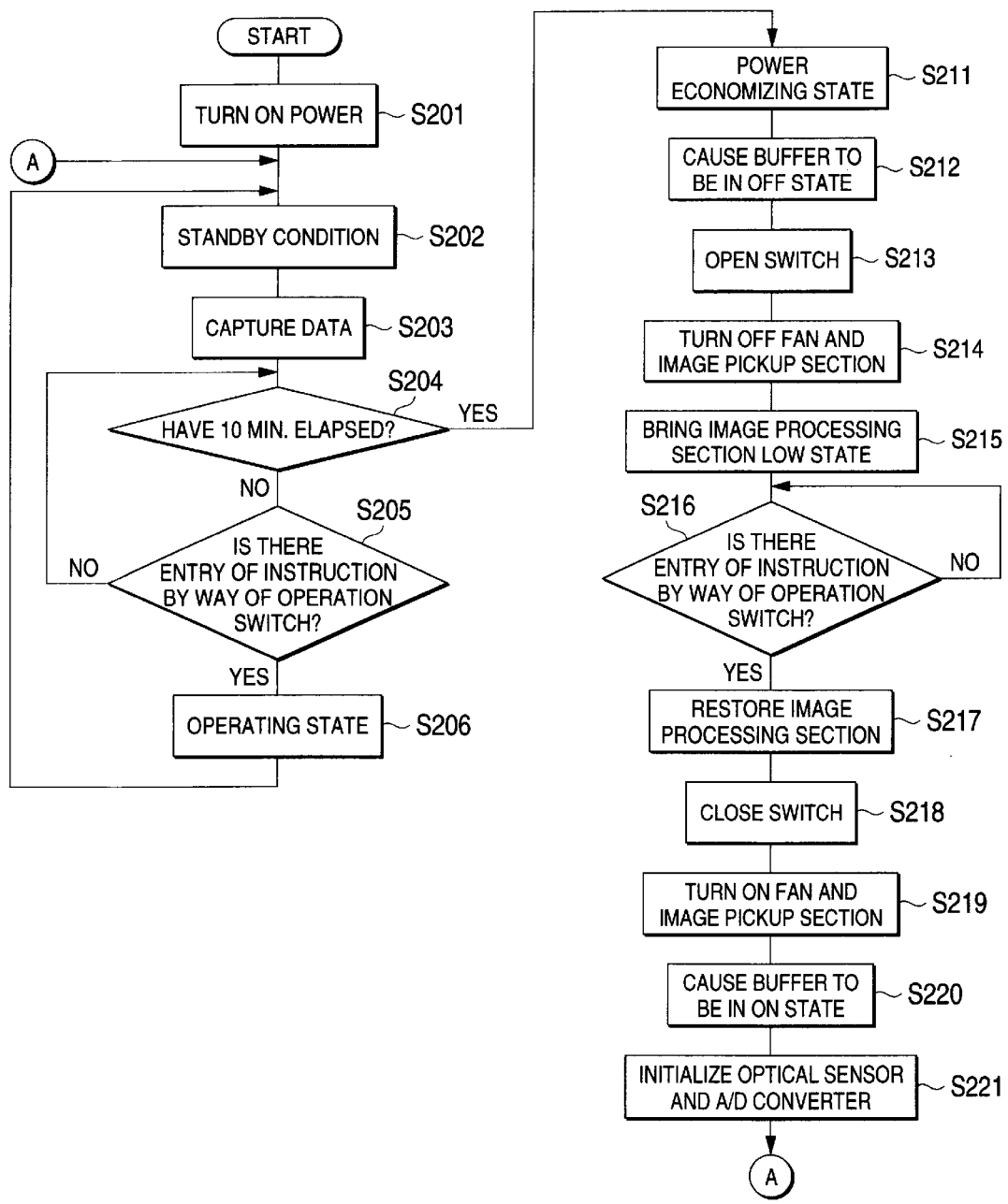
FIG. 2 is a flowchart showing the operation of the image reading apparatus according to the first embodiment.

The operation of the image reading apparatus 1 will be described in detail with reference to FIGS. 2 and 3.

(1) Operation of the Image Reading Apparatus 1 From When the Power is Turned On Until the Image Reading Apparatus 1 Enters a Standby Condition When the user inserts a power cord (not shown) of the image reading apparatus 1 into a power outlet, the power of the image reading apparatus 1 is turned on (S201). When the power is turned on, the light source 51 is illuminated. When the amount of light originating from the light source 51 reaches, for example, 90% of the maximum amount of light, the image reading apparatus 1 enters a standby condition (S202). At this time, the optical sensor 21 reads white and black references (not shown), wherewith the CPU 7 prepares white reference data and black reference data. The thus-prepared white and black reference data sets are stored in the SDRAM 82.

When entry of the image reading apparatus 1 into the standby condition has been completed, the CPU 7 captures photoelectric transducing characteristic data from the optical sensor 21 and the analog-to-digital converter 22 (S203). The photoelectric transducing characteristic data are data to be used for setting an offset value such that the quantity of light entering the optical sensor 21 reaches a certain level or for setting a gain value such that a digital signal into which an electric signal is converted by the analog-to-digital converter 22 reaches a certain level proportional to the quantity of light. The offset value is a numerical value unique to the optical sensor 21, and the gain value is a numerical value unique to the analog-to-digital converter 22. So long as the CPU 7 has captured the photoelectric transducing characteristic data during a standby condition, there can be obviated a necessity for again setting the photoelectric transducing characteristic data, which would otherwise be required when the image reading apparatus 1 has shifted from the power economizing state to the standby condition. When capture of the offset value and the gain value has been completed, the light source 51 is extinguished.

When the image reading apparatus 1 enters a standby condition, the CPU 7 counts a time which has elapsed since the image reading apparatus 1 entered the standby condition. If ten minutes have elapsed without entry of a signal to the operation switch 11 since the image reading apparatus 1 entered the standby condition (S204), the image reading apparatus 1 enters a power economizing state.

(2) Operating State

When the user enters an instruction to the operation switch 11 while the image reading apparatus 1 is in a standby condition (S205), the CPU 7 determines entry of the instruction as shift of the image reading apparatus 1 into an operating state, thus causing the light source 51 to illuminate. The image reading apparatus 1 enters an operating state (S206). During an operating state, the image reading apparatus 1 reads the original 4 placed on the image reading table 3. At this time, the carriage 5 reads the original 4 while moving in parallel with the image reading table 3. After reading of the original 4 has been completed, the light source 51 is extinguished.

(3) Power Economizing State

Figure 3:
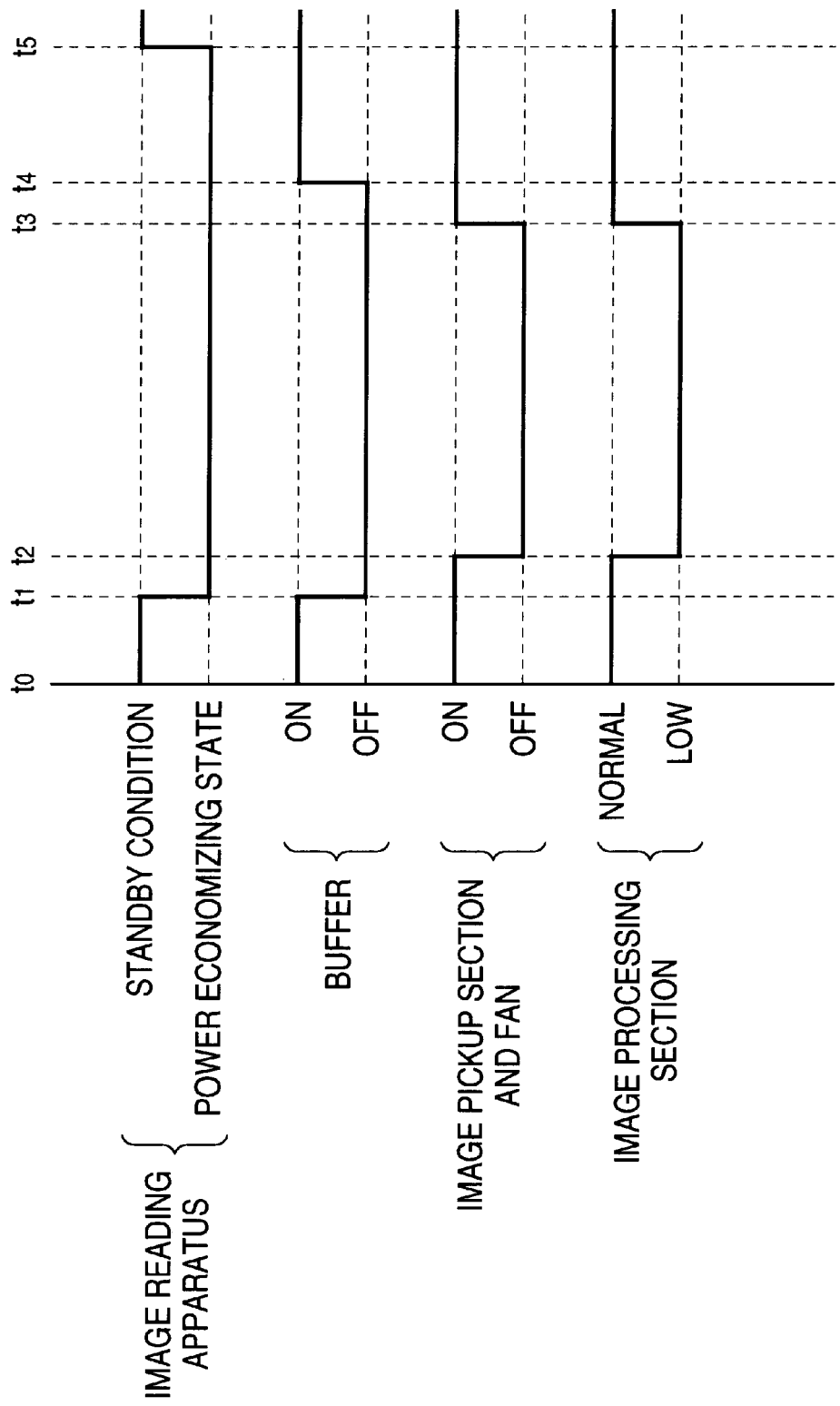
FIG. 3 is a flowchart showing timings at which individual sections of the image reading apparatus according to the first embodiment operate.

As shown in FIG. 3, when it becomes time $t_1$ at which ten minutes have elapsed since time $t_0$ at which reading of the original 4 was completed, the image reading apparatus 1 enters a power economizing state (S211). After the image reading apparatus 1 has entered the power economizing state, the power consumed by the image reading apparatus 1 is reduced. At time $t_1$, the CPU 7 causes the buffer 15 to be in an off state, thereby electrically disconnecting the connection path 14 (S212).

When it becomes time $t_2$ at which 26 milliseconds have elapsed since time $t_1$ at which the connection path 14 was electrically disconnected, the CPU 7 causes the switch 13 to open, thereby electrically disconnecting the power supply path 12 (S213). When the power supply path 12 is electrically disconnected, the supply of power to the image pickup section 20 is stopped, wherewith the image pickup section 20 is turned off. At this time, the CPU 7 stops the supply of power to the image pickup section 20, and also turns off the fan 10 (S214).

Further, the image pickup section 20 is turned off, and the image processing section 6 becomes low (S215). In the low state, a minimum required power is supplied to the image processing section 6 and the SRAM 81 for oscillating a clock signal for the image processing section 6 and for sustaining the data stored in the SRAM 81.

The CPU 7 keeps the image pickup section 20 in an off state until the user enters an instruction by way of the operation switch 11 or the personal computer 70, thereby maintaining the image processing section 6 and the SRAM 81 in a low state.

(4) Operation of the Image Reading Apparatus 1 From When the Image Reading Apparatus 1 Shifts From a Power Economizing State Until the Image Reading Apparatus 1 Enters a Standby Condition When the user enters an instruction by way of the operation switch 11 while the image reading apparatus 1 is in a power economizing state (S216); that is, when it becomes time $t_3$ shown in FIG. 3, the CPU 7 restores the image processing section 6 and the SRAM 81 to an ordinary level from a low state (S217). At this time, the CPU 7 initializes the image processing section 6 and the SDRAM 82. The image processing section 6 is restored, and the switch 13 is closed, thereby resuming the supply of power to the image pickup section 20 (S218). In association with the supply of power to the image pickup section 20 being resumed, the image pickup section 20 and the fan 10 are turned on (S219).

When it becomes time $t_4$ at which a predetermined period of time has elapsed since the turning-on of the image pickup section 20, the CPU 7 causes the buffer 15 to be in an on state, thereby electrically connecting the connection path 14 (S220). At this time, the CPU 7 initializes the optical sensor 21 and the analog-to-digital converter 22 (S221) on the basis of the photoelectric transducing characteristic data captured in step S204.

When it becomes time $t_5$ at which initialization of the optical sensor 21 and the analog-to-digital converter 22 has been completed, the image reading apparatus 1 enters a standby condition (S203). When the image reading apparatus 1 has shifted from a power economizing state to a standby condition, processing pertaining to step S204 in which the CPU 7 captures photoelectric transducing characteristic data may be skipped.

As has been described, in the present embodiment, when the image reading apparatus 1 shifts from a standby condition to a power economizing state, the buffer 15 electrically disconnects the connection path 14. Subsequently, the switch 13 electrically disconnects the power supply path 12. When the image reading apparatus 1 shifts from a power economizing state to a standby condition, the switch 13 electrically connects the power supply path 12, thereby commencing the supply of power to the image pickup section 20. Subsequently, the buffer 15 electrically connects the connection path 14. Consequently, even in a case where the supply of power to the image pickup section 20 is stopped, an electric current will not flow from the image processing section 6 to the analog-to-digital converter 22. Thus, breakage of elements included in the analog-to-digital converter 22 can be prevented. Further, when the image reading apparatus 1 is in a power economizing state, the supply of power to the image pickup section 20 and the fan 10, as well as to the light source 51, is stopped. Therefore, the image reading apparatus 1 can reduce power consumption by a greater amount than does a related image reading apparatus which extinguishes only a light source.

In the first embodiment, a minimum amount of power is supplied to the image processing section 6 and the SRAM 81 even when the image reading apparatus 1 is in a power economizing state. Data which need not to be updated every time the image reading apparatus 1 shifts from a power economizing state to a standby condition, such as a gamma function, are stored in the SRAM 81. Hence, there is no necessity of capturing such data from the outside every time the image reading apparatus 1 shifts from a power economizing state to a standby condition. When the image reading apparatus 1 remains in a standby condition, the CPU 7 captures the photoelectric transducing characteristics of the optical sensor 21 and those of the analog-to-digital converter 22. On the basis of the thus-captured photoelectric transducing characteristics, the CPU 7 initializes the optical sensor 21 and the analog-to-digital converter 22 when the image reading apparatus 1 shifts from a power economizing state to a standby condition. Hence, there is no necessity of re-setting up the image reading apparatus 1, which would otherwise be required when the image reading apparatus 1 shifts from a power economizing state to a standby condition. Consequently, the time required for warming up the image reading apparatus 1 can be shortened, thereby improving the operability of the image reading apparatus 1.

2. Second Embodiment

Figure 4:
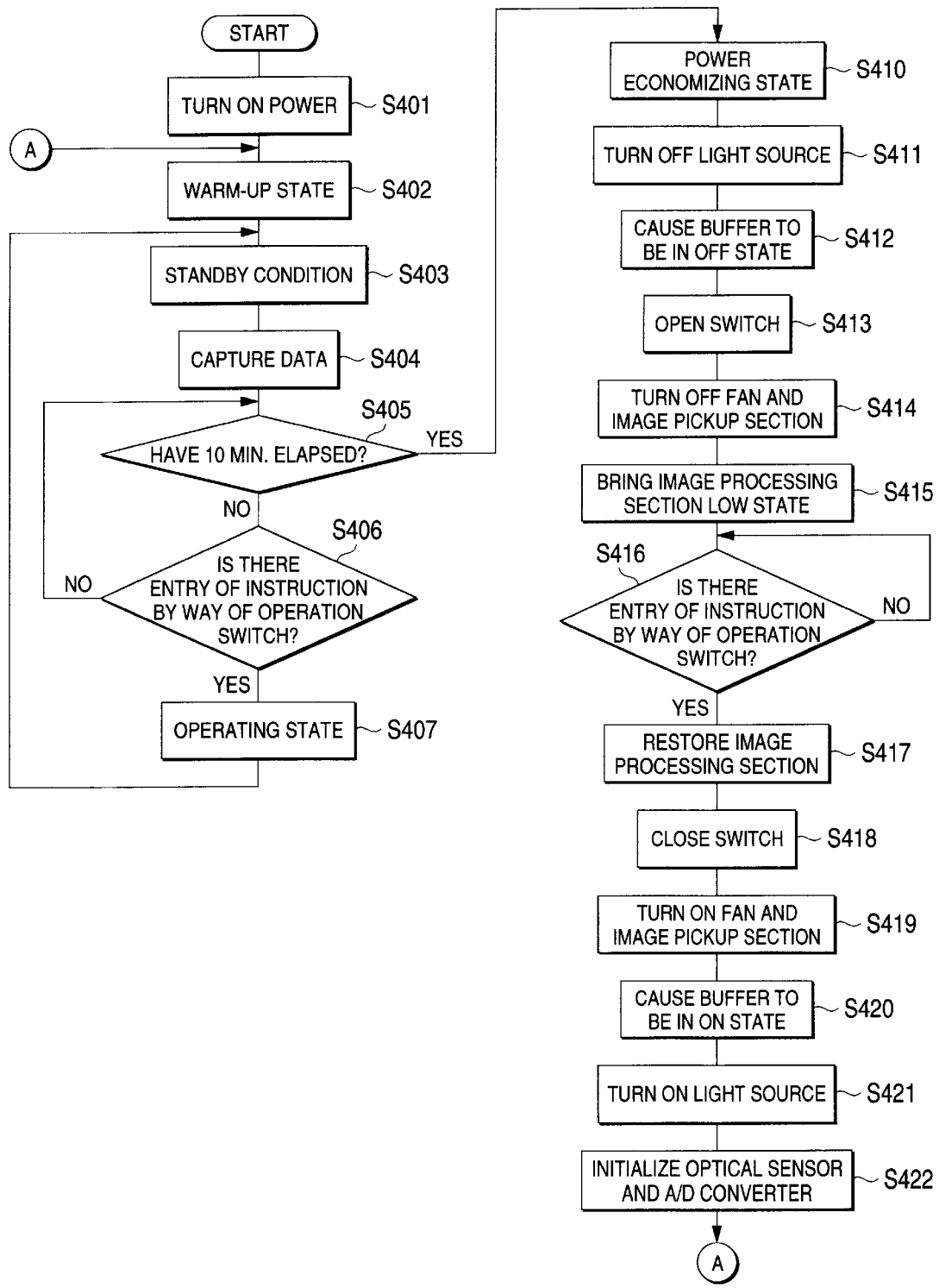
FIG. 4 is a flowchart showing the operation of an image reading apparatus according to a second embodiment of the present invention.

A second embodiment of the present invention now will be described with reference to FIGS. 4 and 5. In the drawings, those element which are identical with those described in connection with the first embodiment are assigned the same reference numerals, and repetition of their explanations is omitted here.

The second embodiment employs a mercury lamp which is less expensive than the xenon lamp used as the light source 51 in the first embodiment. In contrast with the xenon lamp, the mercury lamp requires a time of about one minute when shifting from an extinguished state to an illuminated state. The CPU 7 can control the foregoing individual component circuits; that is, the image reading apparatus 1, so as to enter any one of four states: (1) an operating state, (2) a standby condition, (3) a power economizing state, and (4) a warm-up state.

Respective states of the image reading apparatus 1 now will be described.

(1) Operating state: The light source 51 is illuminated, and the carriage 5 is moved in parallel with the image reading table 3, thereby reading the original 4 placed on the image reading table 3.

(2) Standby condition: The light source 51 remains extinguished. When the user enters an instruction by way of the operation switch 11 or a personal computer, the image reading apparatus 1 enters an operating state, in which reading of the original 4 is possible. If ten minutes have lapsed without entry of an instruction from the user while the image reading apparatus 1 remains in a standby condition, the image reading apparatus 1 shifts from the standby condition to a power economizing state.

(3) Power economizing state: The light source 51 remains extinguished. The power consumed by the image reading apparatus 1 is reduced to 12W or less so as to comply with the guidelines of the Energy Star program.

(4) Warm-up state: During a warm-up state, the image reading apparatus 1 shifts from a power economizing state to a standby condition. When the image reading apparatus 1 is in a warm-up state, the light source 51 which has remained in a power economizing state is illuminated and warmed up. When the amount of light originating from the light source 51 reaches a predetermined amount of light; for example, about 90% of the maximum amount of light, the image reading apparatus 1 enters a standby condition.

The operation of the image reading apparatus 1 will be described in detail with reference to FIGS. 4 and 5.

(1) Operation of the Image Reading Apparatus 1 From When the Power is Turned on Until the Image Reading Apparatus 1 Enters a Standby Condition When the user inserts a power cord (not shown) of the image reading apparatus 1 to a power outlet, the power of the image reading apparatus 1 is turned on (S401). When the power is turned on, the light source 51 is illuminated, and the image reading apparatus 1 enters a warm-up operation (S402). When the amount of light originating from the light source 51 reaches, for example, 90% of the maximum amount of light, the image reading apparatus 1 enters a standby condition (S403). Preparation and storage of white and black reference data and capture of photoelectric transducing characteristics (S404) are performed in the same manner as in the first embodiment.

When the image reading apparatus 1 has entered a standby condition, the CPU 7 counts a time which has elapsed since the image reading apparatus 1 entered the standby condition. If ten minutes have elapsed without entry of a signal to the operation switch 11 since the image reading apparatus 1 entered the standby condition (S405), the light source 51 is extinguished (S410).

(2) Operating State

When the user enters an instruction to the operation switch 11 while the image reading apparatus 1 is in a standby condition (S406), the CPU 7 determines entry of the instruction as shift of the image reading apparatus 1 into an operating state, thereby commencing reading of the original 4 placed on the image reading table 3 (S407). At this time, the carriage 5 reads the original 4 while moving in parallel with the image reading table 3.

(3) Power Economizing State

Figure 5:
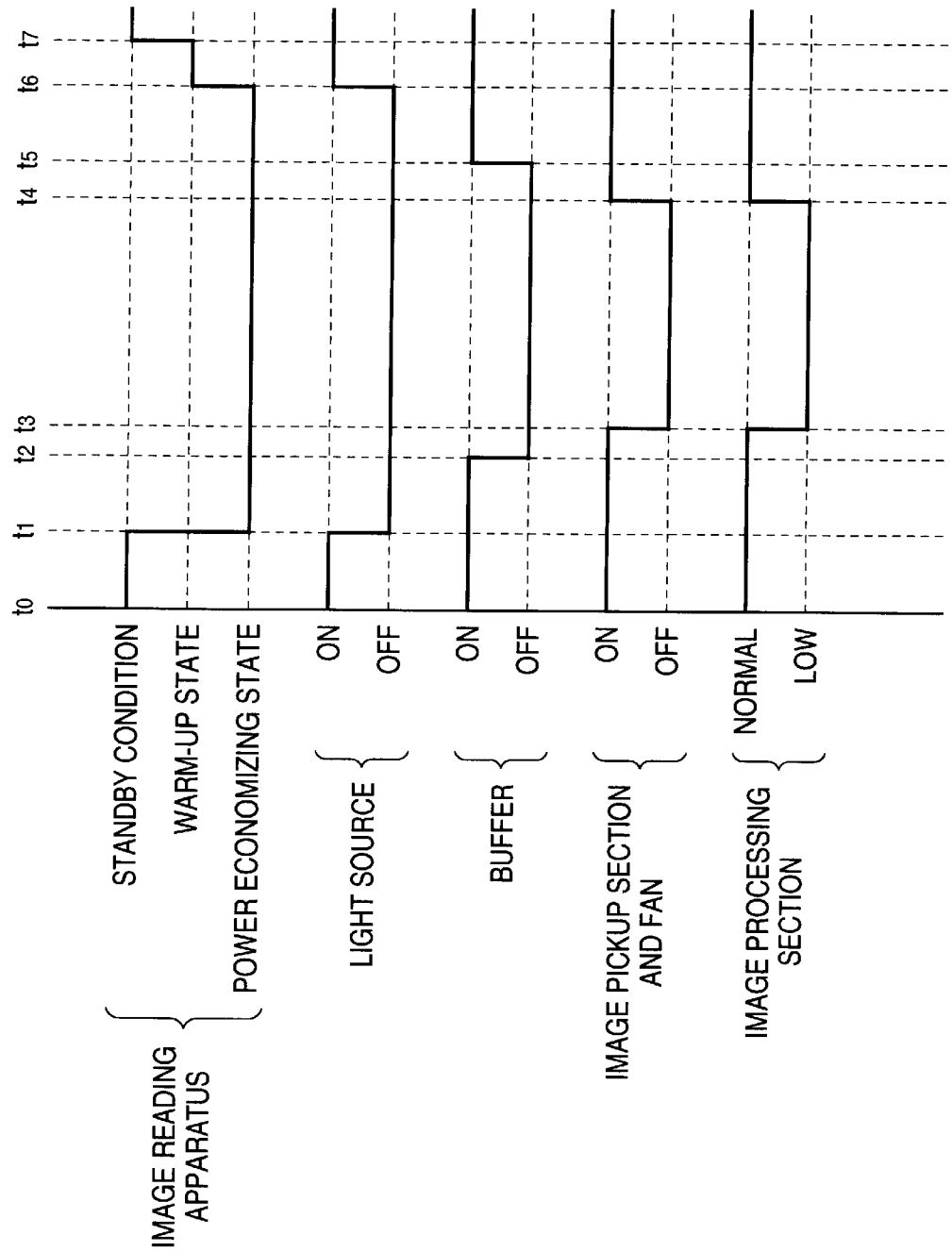
FIG. 5 is a flowchart showing timings at which individual sections of the image reading apparatus according to the second embodiment operate.

As shown in FIG. 5, when it becomes time $t_1$ at which ten minutes have elapsed since time $t_0$ being in the standby condition, the image reading apparatus 1 enters a power economizing state. After the image reading apparatus 1 has entered the power economizing state, the light source 51 is extinguished, whereby the power consumed by the image reading apparatus 1 is reduced (S411). When it becomes time $t_2$ at which ten minutes have elapsed since time $t_1$ at which the light source 51 was extinguished, the CPU 7 causes the buffer 15 to be in an off state, thereby electrically disconnecting the connection path 14 (S412).

When it becomes time $t_3$ at which 26 milliseconds have elapsed since time $t_2$ at which the connection path 14 was electrically disconnected, the CPU 7 causes the switch 13 to open, thereby electrically disconnecting the power supply path 12 (S413). When the power supply path 12 is electrically disconnected, the supply of power to the image pickup section 20 is stopped, wherewith the image pickup section 20 is turned off. At this time, the CPU 7 stops the supply of power to the image pickup section 20, and also turns off the fan 10 (S414).

Further, the image pickup section 20 is turned off, and the image processing section 6 becomes low (S415). In the low state, a minimum required power is supplied to the image processing section 6 and the SRAM 81 for oscillating a clock signal for the image processing section 6 and for sustaining the data stored in the SRAM 81. At this time, no power is supplied to the SDRAM 82.

The CPU 7 retains the image pickup section 20 in an off state until the user enters an instruction by way of the operation switch 11 or the personal computer 70, thereby maintaining the image processing section 6 and the SRAM 81 in a low state.

(4) Operation of the Image Reading Apparatus 1 From When the Image Reading Apparatus 1 Shifts From a Power Economizing State Until the Image Reading Apparatus 1 Enters a Standby Condition When the user enters an instruction by way of the operation switch 11 while the image reading apparatus 1 is in a power economizing state (S416); that is, when it becomes time $t_4$ shown in FIG. 5, the CPU 7 restores the image processing section 6 and the SRAM 81 to an ordinary level from a low state (S417). At this time, the CPU 7 initializes the image processing section 6 and the SDRAM 82. The image processing section 6 is restored, and the switch 13 is electrically closed, thereby resuming the supply of power to the image pickup section 20 (S418). In association with the supply of power to the image pickup section 20 being resumed, the image pickup section 20 and the fan 10 are turned on (S419).

When it becomes time $t_5$ at which a predetermined period of time has elapsed since the turning-on of the image pickup section 20, the CPU 7 causes the buffer 15 to be in an on state, thereby electrically connecting the connection path 14 (S420). When it becomes time $t_6$, the CPU 7 causes the light source 51 to illuminate (S421). At this time, the CPU 7 initializes the optical sensor 21 and the analog-to-digital converter 22 (S422) on the basis of the photoelectric transducing characteristic data captured in step S404. Then, the image reading apparatus 1 shifts to a warm-up state (S402). Although illuminated at time $t_6$, the light source 51 may be illuminated anytime after time $t_4$.

When it becomes time $t_7$ at which the warming up of the image reading apparatus 1 has completed, the image reading apparatus 1 enters a standby condition (S403). When the image reading apparatus 1 has shifted from a power economizing state to a standby condition, processing pertaining to step S404 in which the CPU 7 captures photoelectric transducing characteristic data may be skipped.

In the previously described embodiments, the present invention has been applied to flatbed image reading apparatuses. However, the present invention may be applied to a sheet-feeding-type image reading apparatus.

It is contemplated that numerous modifications may be made to the image reading apparatus of the present invention without departing from the spirit and scope of the invention as defined in the following claims.

What is claimed is:

1. An image reading apparatus, comprising:

an image reading table on which an original is placed;

a light source which illuminates the original;

an image pickup section including an optical sensor which converts, into an electric signal, at least one of a light reflected from the original and a light having been transmitted through the original, and a converter which converts the electric signal into a digital signal;

an image processing section which produces image data on the basis of the digital signal and can output the image data;

a control section capable of controlling the light source, the image pickup section, and the image processing section so as to enter one of an operating state in which the original is read, a standby condition in which the image reading apparatus is in a standby condition while remaining able to read the original, and a power economizing state in which power to be consumed is reduced;

a first switching device which connects or disconnects supply of power to the image pickup section; and a second switching device which establishes or cancels an electrical connection between the converter and the image processing section.

2. The image reading apparatus of claim 1, wherein the image processing section is electrically energized in the power economizing state.

3. The image reading apparatus of claim 2, wherein when the standby condition is shifted to the power economizing state, the control section causes the first switching device to electrically open after having electrically opened the second switching device.

4. The image reading apparatus of claim 3, wherein when the power economizing state is shifted to the standby condition, the control section causes the second switching device to electrically close after having electrically closed the first switching device.

5. The image reading apparatus of claim 4, further comprising a ventilating section capable of blowing air to the light source, the image pickup section, the image processing section, and the control section, wherein the ventilating section operates in association with operation of the image pickup section.

6. The image reading apparatus of claim 4, wherein the control section captures information on the image pickup section in the standby condition, and the control section initializes the image pickup section on the basis of the information when the power economizing state is shifted to the standby condition.

7. The image reading apparatus of claim 4, further comprising an instruction input section which enables entry, with respect to the control section from an outside, of an instruction for instructing to shift from the power economizing state to the standby condition.

* * * * *